(12) United States Patent
Wu

(10) Patent No.: US 7,059,616 B2
(45) Date of Patent: Jun. 13, 2006

(54) CUTTING MACHINE PUSH CART

(75) Inventor: San-Ching Wu, Taipei (TW)

(73) Assignee: Super Made Products Co., Ltd. (TW)

( * ) Notice: Subject to any disclaimer, the term of this patent is extended or adjusted under 35 U.S.C. 154(b) by 0 days.

(21) Appl. No.: 10/919,324

(22) Filed: Aug. 17, 2004

(65) Prior Publication Data

US 2006/0038383 A1  Feb. 23, 2006

(51) Int. Cl.
*B62B 1/00* (2006.01)
(52) U.S. Cl. .................. 280/47.24; 108/145; 108/117; 108/641; 108/47.37
(58) Field of Classification Search ............ 280/47.24, 280/43.16, 47.34, 30, 35, 47.19, 641, 639, 280/649; 108/19, 117, 118, 145, 132; 248/676, 248/166; 144/286.1
See application file for complete search history.

(56) References Cited

U.S. PATENT DOCUMENTS

| | | | |
|---|---|---|---|
| 982,882 A * | 1/1911 | Schimmel ................. 280/43.16 |
| 1,073,122 A * | 9/1913 | Henne ......................... 108/119 |
| 1,941,333 A * | 12/1933 | Whalley et al. ............ 108/119 |
| 1,990,032 A * | 2/1935 | Johanson .................... 108/119 |
| 2,544,220 A * | 3/1951 | Concklin ..................... 280/641 |
| 2,843,391 A * | 7/1958 | Pelletier ..................... 108/116 |
| 2,958,873 A * | 11/1960 | Ferneau ...................... 108/117 |
| 3,001,559 A * | 9/1961 | Szopo ....................... 144/286.1 |
| 3,110,476 A * | 11/1963 | Farris ......................... 108/119 |
| 3,669,031 A * | 6/1972 | Cole ........................... 108/132 |
| 4,249,749 A * | 2/1981 | Collier ......................... 280/35 |
| 4,611,823 A * | 9/1986 | Haas ........................... 280/641 |
| 4,655,466 A * | 4/1987 | Hanaoka .................. 280/47.34 |
| 4,712,653 A * | 12/1987 | Franklin et al. ............ 108/145 |
| 4,728,118 A * | 3/1988 | Haas ........................... 280/641 |
| 5,542,639 A * | 8/1996 | Wixey et al. ............... 108/117 |
| 5,588,377 A * | 12/1996 | Fahmian ..................... 108/145 |
| 5,632,209 A * | 5/1997 | Sakakibara ................. 108/145 |
| 5,694,864 A * | 12/1997 | Langewellpott ............. 108/145 |
| 6,854,314 B1* | 2/2005 | Cleave et al. ............... 248/676 |

* cited by examiner

*Primary Examiner*—Hau Phan
(74) *Attorney, Agent, or Firm*—Bacon & Thomas PLLC

(57) ABSTRACT

A foldable push cart to carry a cutting machine comprised of a tabletop frame, a support frame and a telescoping rod; adaptable to any cutting machine; an extension bracket on each side of the cart works with built-in oblique push block and slide rod depending on the length and height of the individual work piece; a hoisting cable controls work height and retraction of the cart; the telescoping rod provides self-locking safety function, and wheels are pivoted to a pair of cross legs.

10 Claims, 12 Drawing Sheets

CUTTING MACHINE PUSH CART

BACKGROUND OF THE INVENTION (a) Field of the Invention

The present invention is related to a push cart for carrying a cutting machine or similar machine, and more particularly, to one that is foldable, height adjustable, easy handling and adaptable to any model of a cutting machine.

(b) Description of the Prior Art

Usually a cutting machine is fixed to a table for use. To make it mobile, a foldable support frame generally available in the market (as taught in U.S. Pat. Nos. 6,722,618 and 6,314,893) is essentially comprised of the support frame adapted with multiple telescoping legs. However, the mobile support frame is comparatively heavy and it is not convenient since the user has to carry it from one jobsite to another. Besides, it also presents safety concerns since the legs when retreated or extended are not provide with any safety means to secure them.

Furthermore, many brands and models of cutting machines generally available in the market have different specifications on the location of the positioning location, and the support frames for the cutting machines are not provided with an universal positioning structure for the cutting machines. Accordingly, the user has to purchase the support frame exclusively designed for a particularly brand or model of the cutting machine. It is not cost efficiency due to the lacking in interchangeability among the support frames to force the user to abandon the existing support frame upon making a buy of another brand or model of the cutting machine.

SUMMARY OF THE INVENTION

The primary purpose of the present invention is to provide a cart to carry various types of cutting machine, that is adapted with telescoping rods for safe storage and control the limiting status of the legs when stretched up for use.

Another purpose of the present invention is to provide a cart to carry various types of cutting machine having provided on the tabletop frame of the cart adjustable positioning panels to compromise various brands of the cutting machine.

Another purpose yet of the present invention is to provide a cart to carry various types of cutting machine having provided with an extension bracket each on both sides of the tabletop frame to provide proper support to the work piece.

Another purpose yet of the present invention is to provide a cart to carry various types of cutting machine having the lower end of a cross leg of a support frame is pivoted to a pair of wheels for them to touch the ground when the cross leg on the other side is lifted to easily push the cart.

Another purpose yet of the present invention is to provide a cart to carry various types of cutting machine having the control switch of the telescoping rod operated by a hoisting cable made of soft steel cord with the hoisting cable to be laid up according to the structure of the cart for the control switch to be properly located as selected without limitation.

Another purpose yet of the present invention is to provide a cart to carry various types of cutting machine having a built in oblique push block to uphold and secure in position a roller and the extension bracket.

DETAILED DESCRIPTION OF THE PREFERRED EMBODIMENTS

Figure 1:
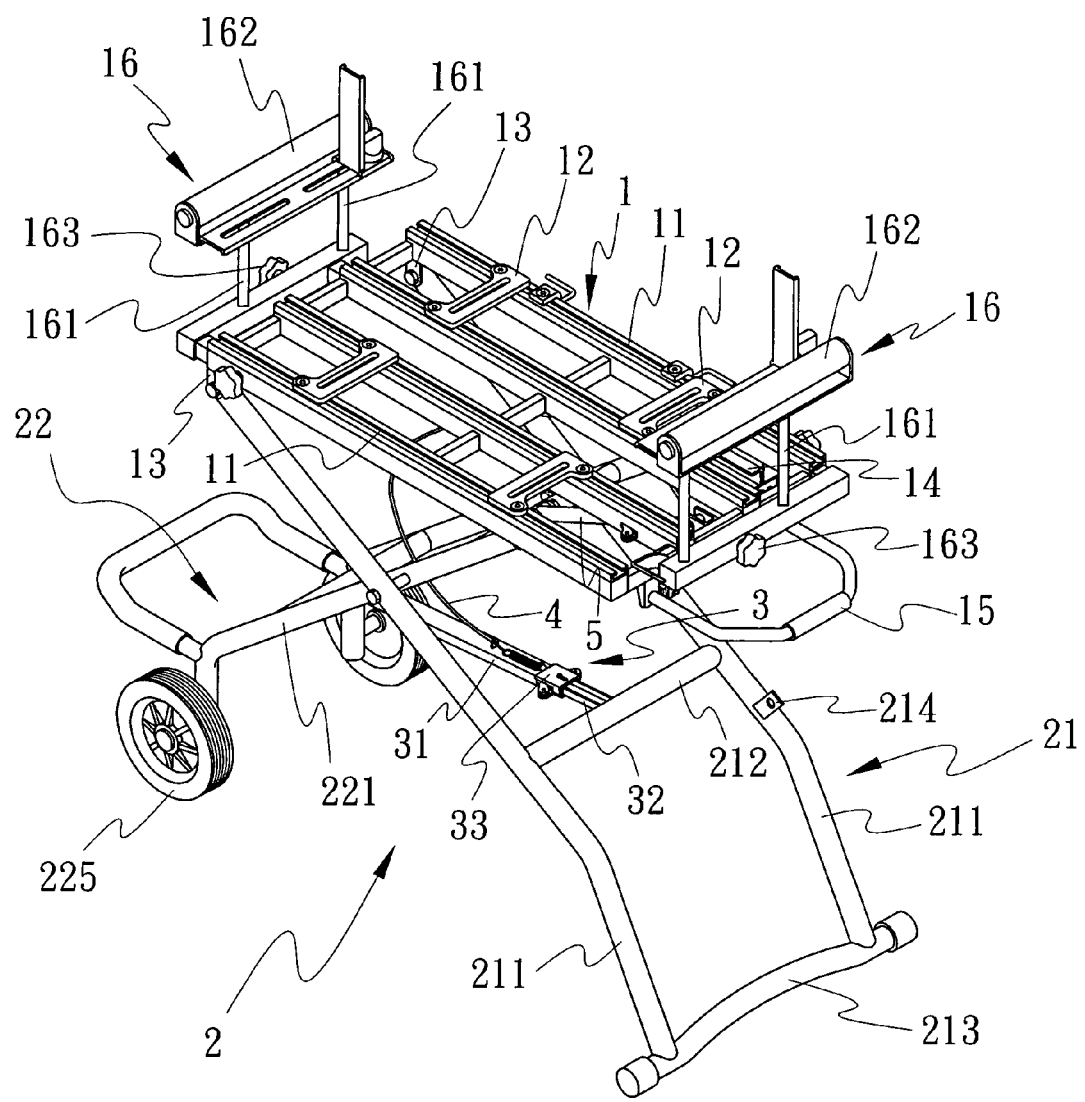
FIG. 1 is a perspective view of an assembly of the present invention.
Figure 2:
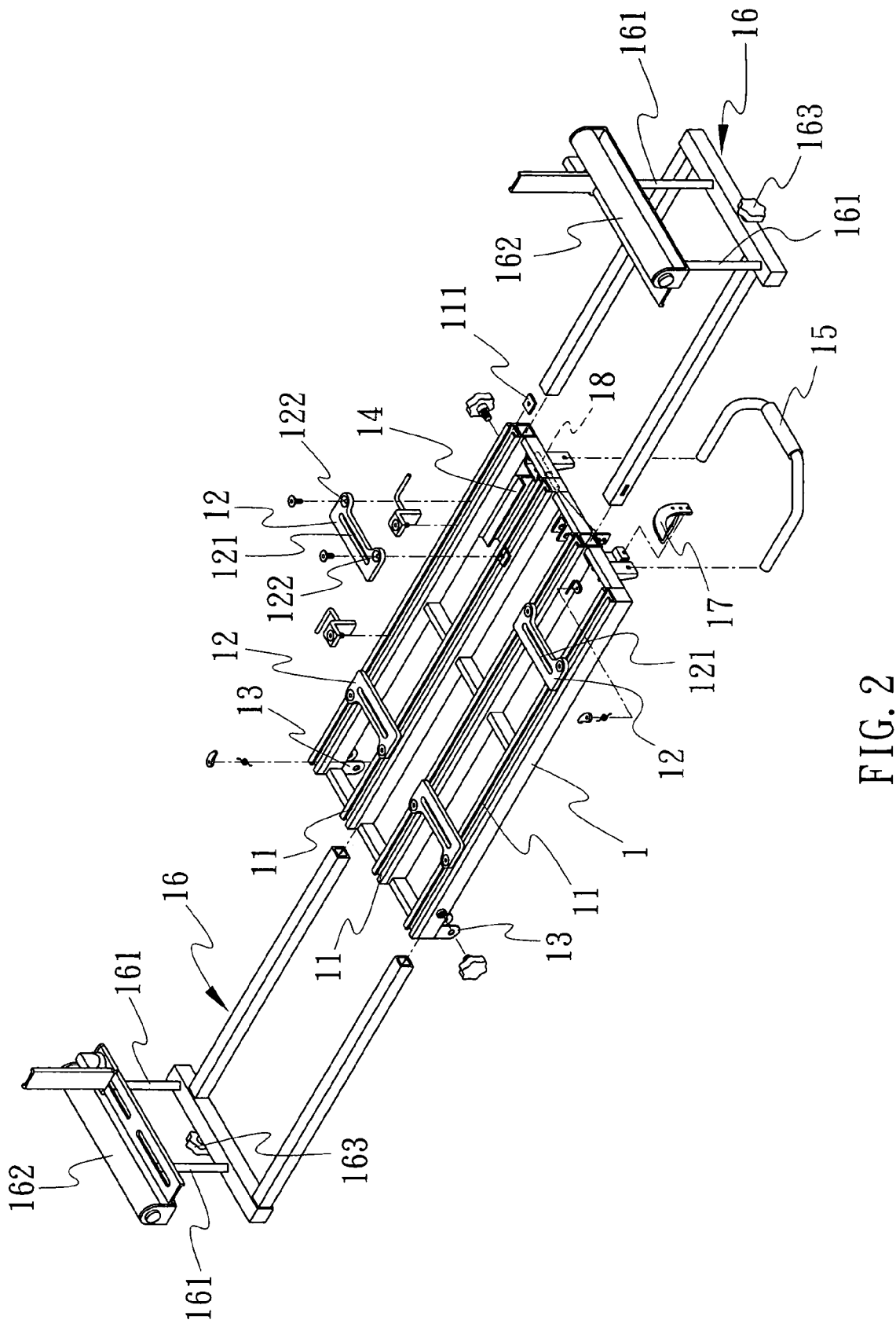
FIG. 2 is an exploded view of a tabletop frame of the present invention.

Referring to FIG. 1, a cutting machine push cart of the present invention is essentially comprised of a tabletop frame 1, a support frame 2 and a telescoping rod 3. Wherein, the tabletop frame I as illustrated in FIG. 2 is related to a rectangular frame. Multiple tracks 11 are provided at a given spacing and in parallel to one another between both shorter sided of the frame; multiple locking plates 111 each having a central locking hole is inserted into each track 11 for them to lock multiple positioning plates 12 onto the tracks 11. Two pivot holders 13, two chutes 14 and a handle 15 are provided to each side at the lower end of the tabletop frame 1. Two extension brackets 16 are respectively inserted into hollow tubes provided between both ends of the tabletop frame 1.

Figure 3:
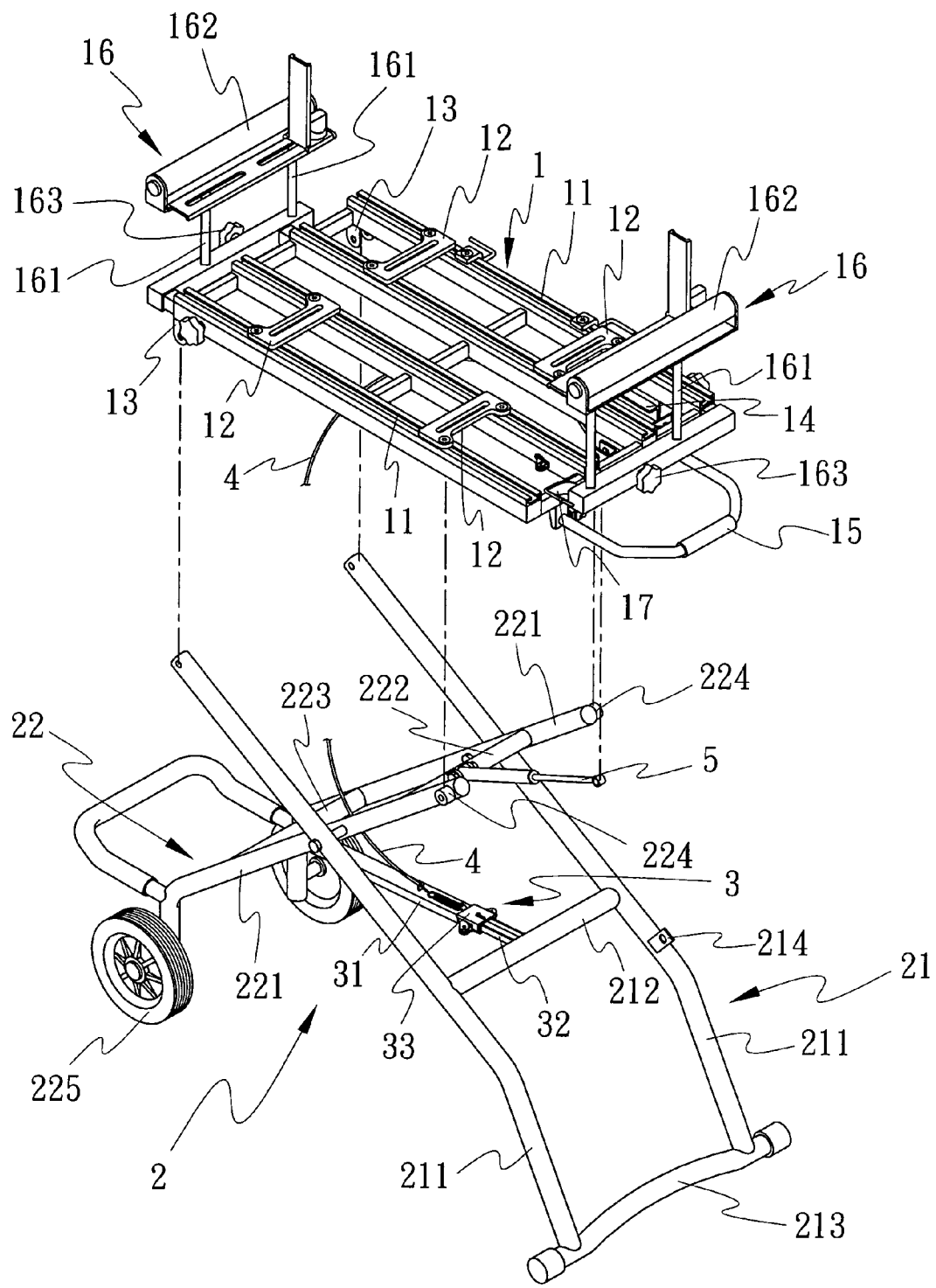
FIG. 3 is an exploded view of the tabletop frame and its support frame of the present invention.

The support frame 2 as illustrated in FIG. 3 includes a first pair of cross legs 21 and a second pair of cross legs 22. The first pair of cross legs 21 is comprised of two side tubes 211, an upper brace 212 and a lower brace 213. The upper brace 212 is provided in the middle section of both side tubes 211 and the lower brace 213 is connected to both lower ends of the side tubes 211. The second pair of cross legs 22 is comprised of two side tubes 221, an upper brace 222 and a lower brace 223. The upper brace 222 is provided in the upper section of both side tubes 221; and the lower brace 223, the lower section of both side tubes 221. The tabletop of each side tube 221 is provided with a wheel 225 and the lower end of each side tube 221 is pivoted to a pulley 224. Both side tubes 211 of the first pair of cross legs 21 are respectively and mutually pivoted with both side tubes 221 of the second pair of cross legs 22. Tabletops of both side tubes 211 of the first pair of cross legs 21 are respectively pivoted to the pivot holder 13 on the tabletop frame 1. Both pulleys 224 at the tabletops of both side tubes 221 of the second pair of cross legs 22 are inserted into the chute 14 to have the limiting support.

Figure 4:
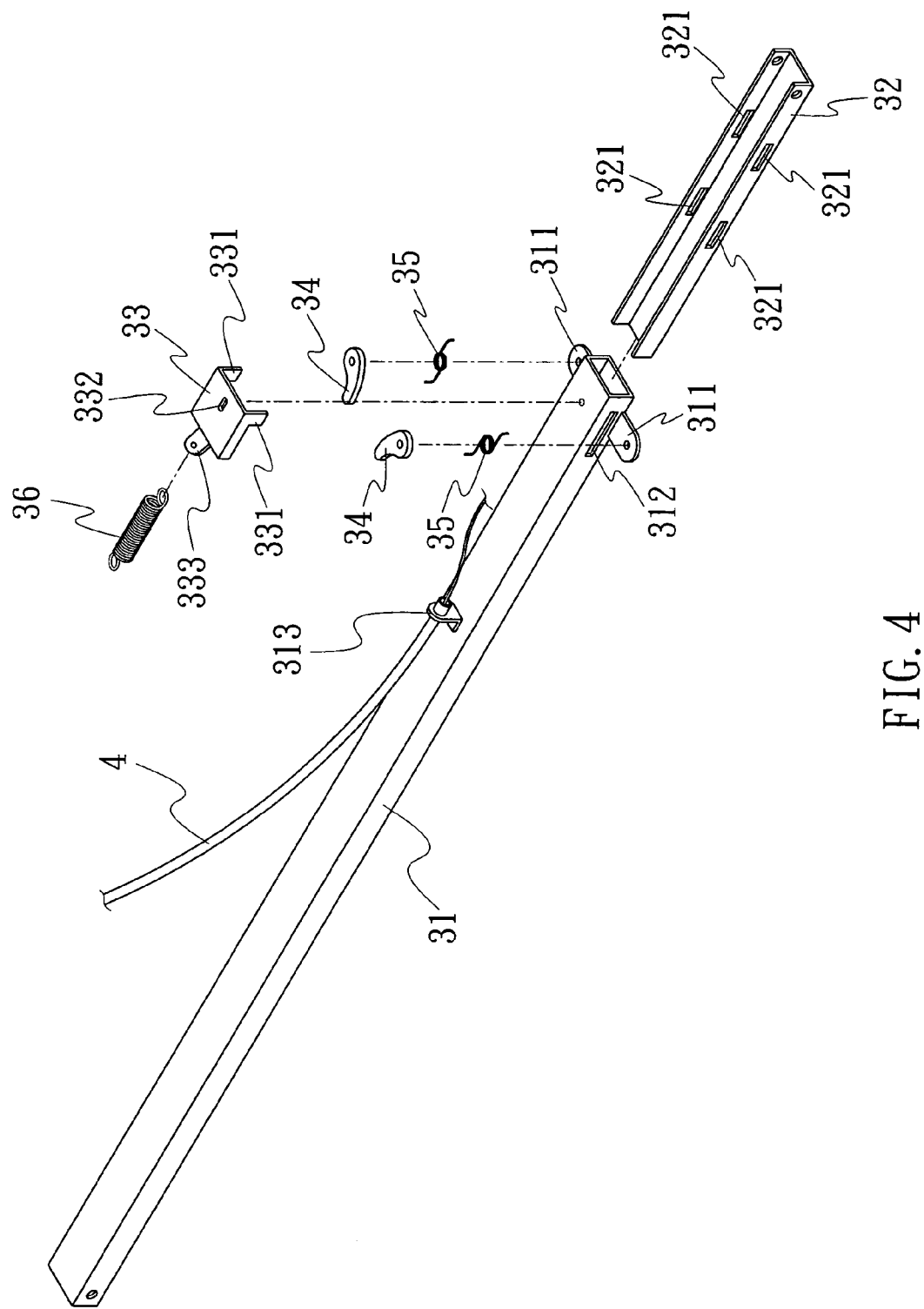
FIG. 4 is an exploded view of a telescoping rod of the present invention.

As illustrated in FIG. 4, the telescoping rod 3 includes an outer tube 31, an inner tube 32, a fastening device 33, two catches 34, a torsion spring 35 and a tension spring 36. Wherein, the outer tube 31 related to a rectangular hollow tube has one end pivoted to the lower brace 223 of the second pair of cross legs 22, and both sides of the other end respectively provided with a positioning bit 311 and a slot 312. A fixation bit 313 is provided on the outer tube 31 at where close to the slotted end of the outer tube 31 to secure a hoisting cable 4.

The U-shaped inner tube 32 in a size adaptable to that of the outer tube 31 has one end pivoted to the upper brace 212 of the first pair of cross legs 21, and multiple positioning slots 321 are provided on both sides of the inner tube 32.

The fastening device 33 essentially functions as a safety switch for the control of the telescoping rod 3. On one end each of both sides of the fastening device 33 is provided with a claw 331, on the tabletop of the fastening device 33 is provided with a limiting slot 332, and an eyelet 333 is provided at the rear end of the fastening device 33.

The free end of the outer tube 31 covers up that of the inner tube 32 while both catches 34 adapted with respective torsion springs 35 are pivoted to the positioning bits 311 so that each torsion spring 35 is hooked at where between the positioning bit 311 and the catch 34. Accordingly, the mobile end of the catch 34 extends by means of the torsion applied from the torsion spring 35 into the slot 312 and the positioning slot 321 for the fastening device 33 to be locked by taking advantage of the limiting slot 332 into the outer tuber 31 at where above the positioning bit 311. When the fastening device 33 slides at the tabletop end of the outer tube 31, the claw 331 of the fastening device 33 dials the catch 34 to flip over towards the outer side of the slot 312 for one end of the tension spring 36 to hook into the eyelet 333 and the other end of the tension spring 36 to hook up the terminal of the hoisting cable 4. Consequently, both catches 34 upholds at where between the slot 312 and the positioning slot 321 to permit the telescoping rod 3 comprised of the outer tube 31 and the inner tube 32 being capable of controlling its extension status.

The support frame 2 is pivoted to the bottom of the tabletop frame 1 with the telescoping rod 3 connected to where below the support frame 2 is pivoted to reach safety positioning by having the telescoping rod 3 to restrict the expanding status of the support frame 2. Finally, the foldable cart allowing accommodation of various brands of cutting machine is completed with its assembly.

Figure 5:
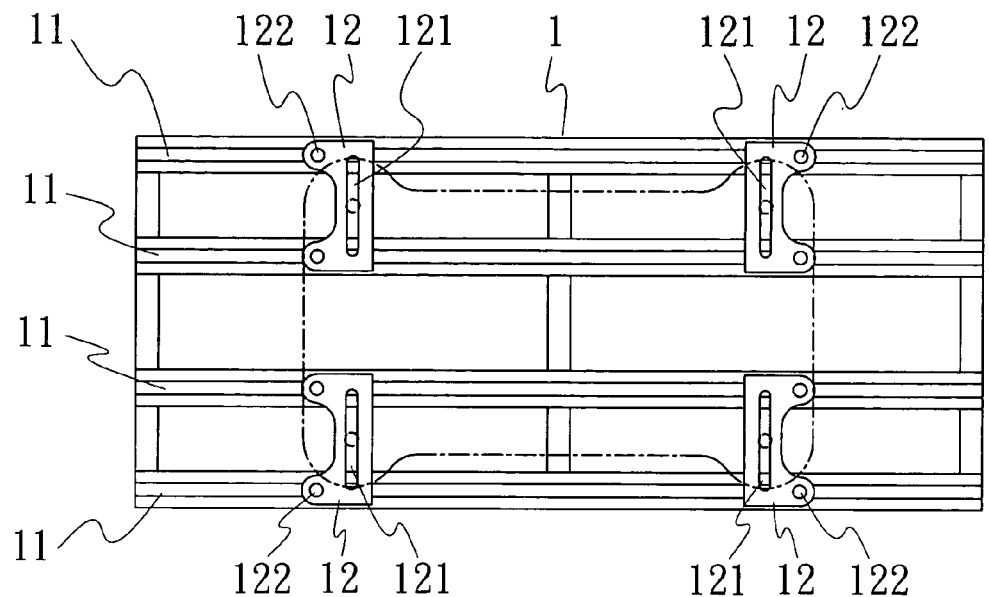
FIG. 5 is a schematic view showing a status of the tabletop frame in use.
Figure 6:
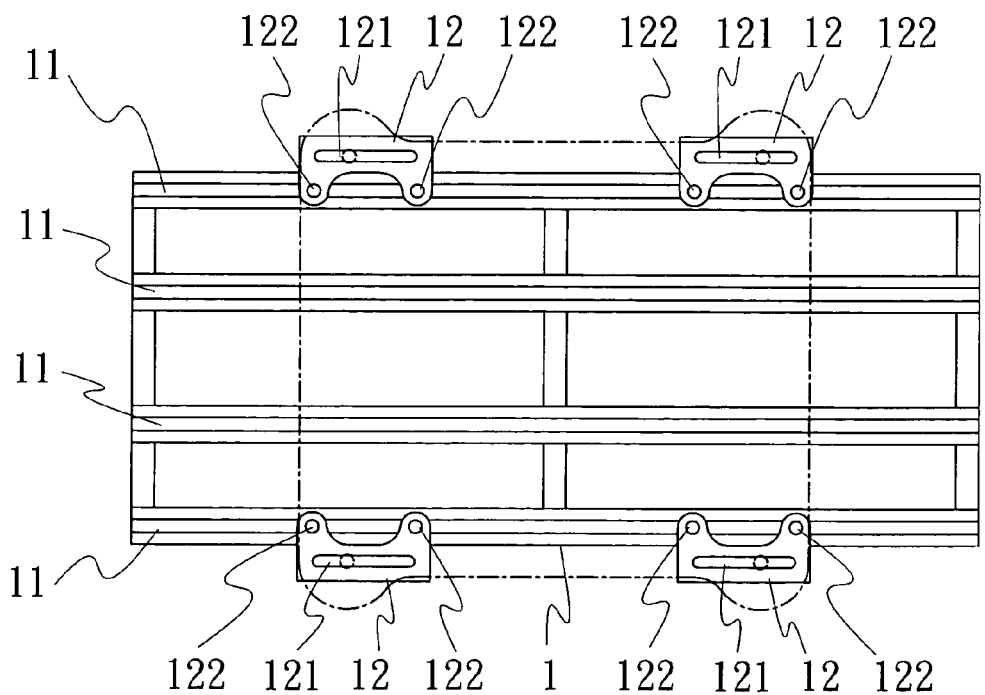
FIG. 6 is a schematic view showing another status of the tabletop frame in use.

Furthermore, the positioning plate 12 is punched on its surface a slot 121 and one locking hole 122 is each provided on both ends of the positioning plate 12, and a screw penetrates through the locking hole 122 into the slot above the track II so to firmly secure the locking plate 111 and the positioning plate 12 to the track 11. Accordingly, once the selected positioning plate 12 is in position at where in relation to the cutting machine, the slot 121 from the positioning plate 12 provides a proper position to secure the cutting machine as illustrated in FIGS. 5 and 6.

Figure 7:
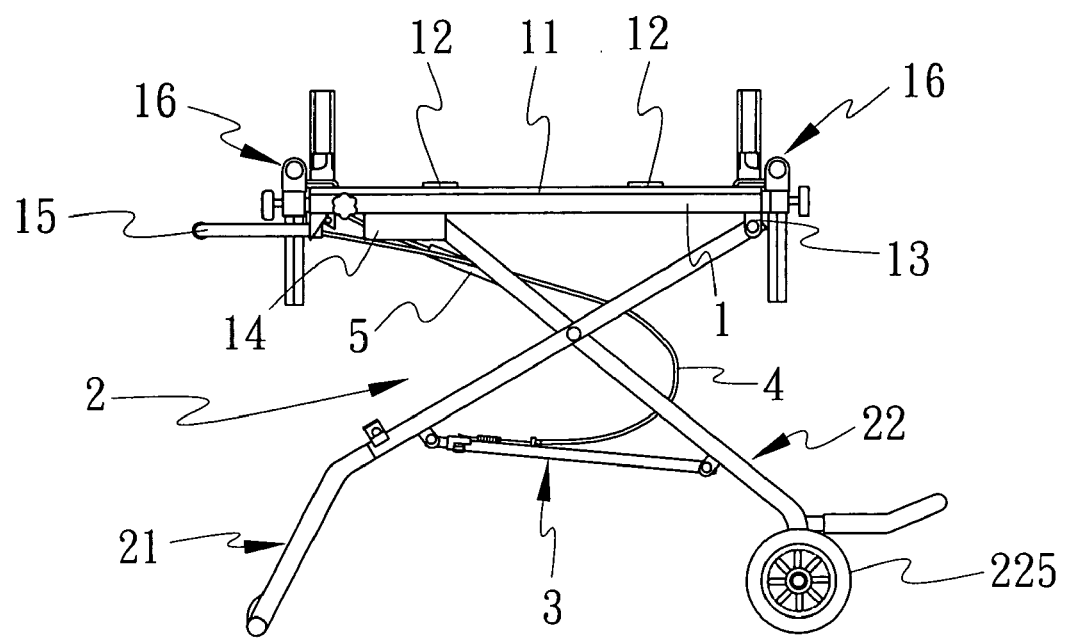
FIG. 7 is a schematic view showing a structure of the support frame when stretched up.
Figure 8:
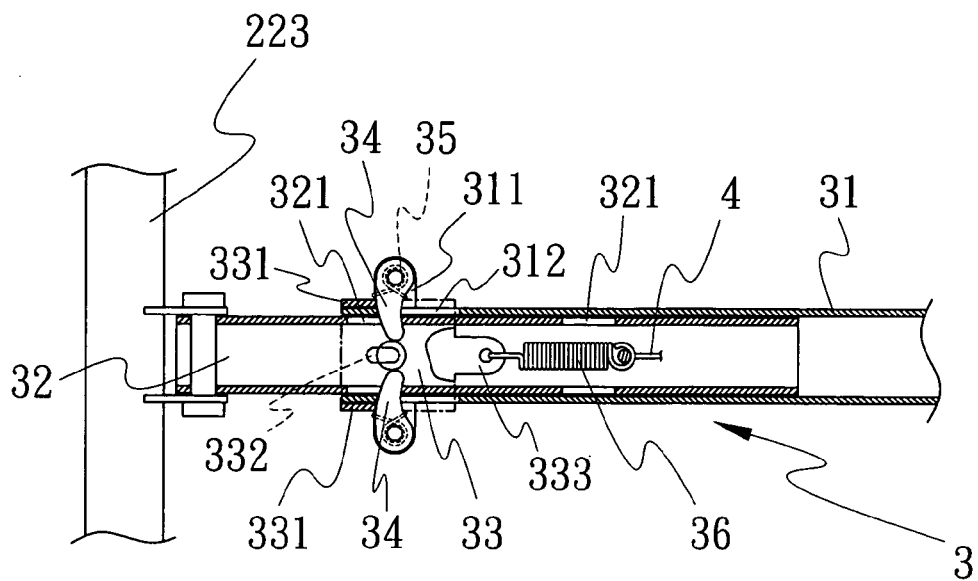
FIGS. 8, 9, 10, and 11 are schematic view showing the action in serious of the telescoping rod when the support frame is retracted.

The hoisting cable 4 is used to control the positioning of the telescoping rod 3. As illustrated in FIG. 7, when the support frame 2 is stretched to support the tabletop frame 1, the weight of the tabletop frame 1 compresses against the top end of the support frame 2 resulting in that an expansion force is formed at the rear end where the first pair of cross legs 21 is pivoted to the second pair of cross legs 22, and applied to both ends of the telescoping rod 3 for the outer tube 31 and the inner tube 32 to be pulled away from each other as illustrated in FIG. 8. As both catches 34 extend to uphold in the slot 312 and the positioning slots 321, both of the outer tube 31 and the inner tube 32 of the telescoping rod 3 are restricted by both catches 34, thus to secure the extended support frame 2 in position.

Figure 9:
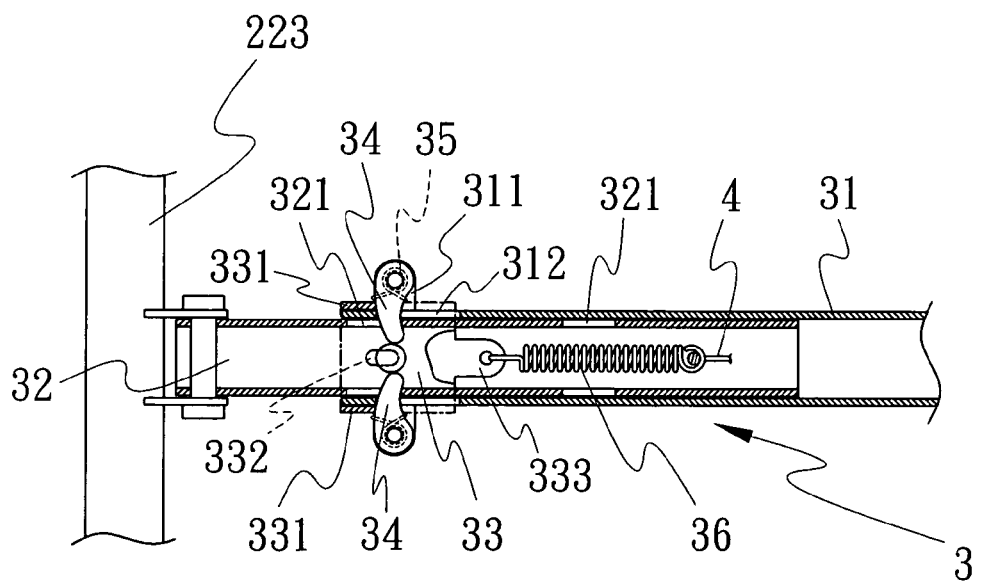
Figure 10:
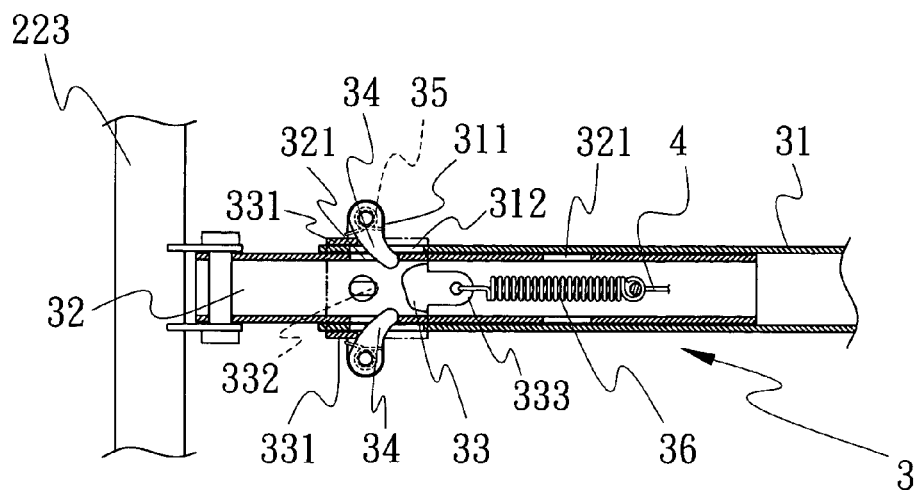
Figure 11:
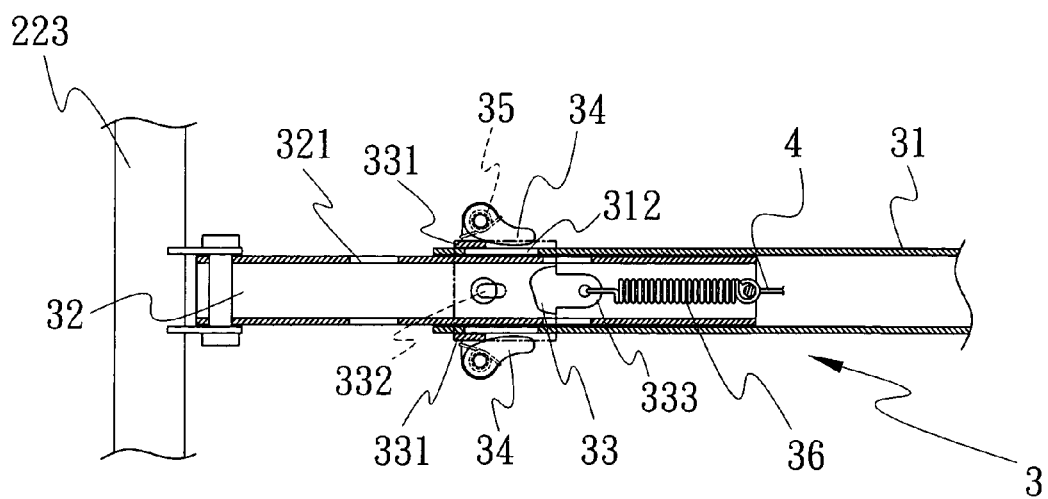
Figure 12:
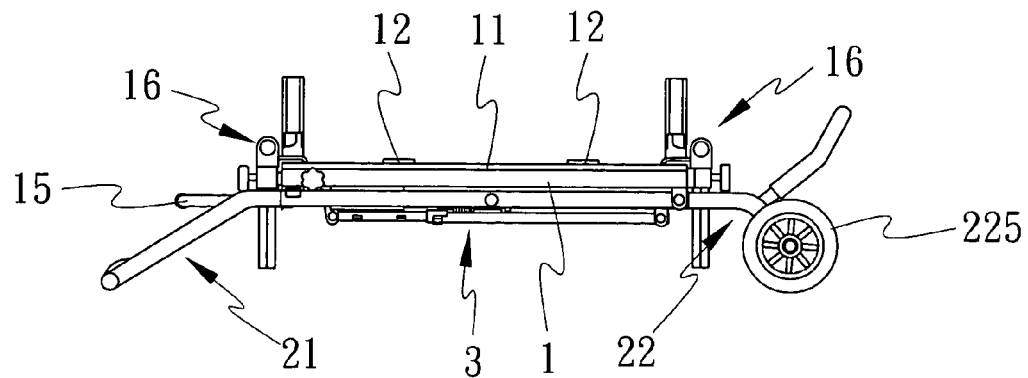
FIG. 12 is a schematic view showing a structure of the support frame when retracted.
Figure 13:
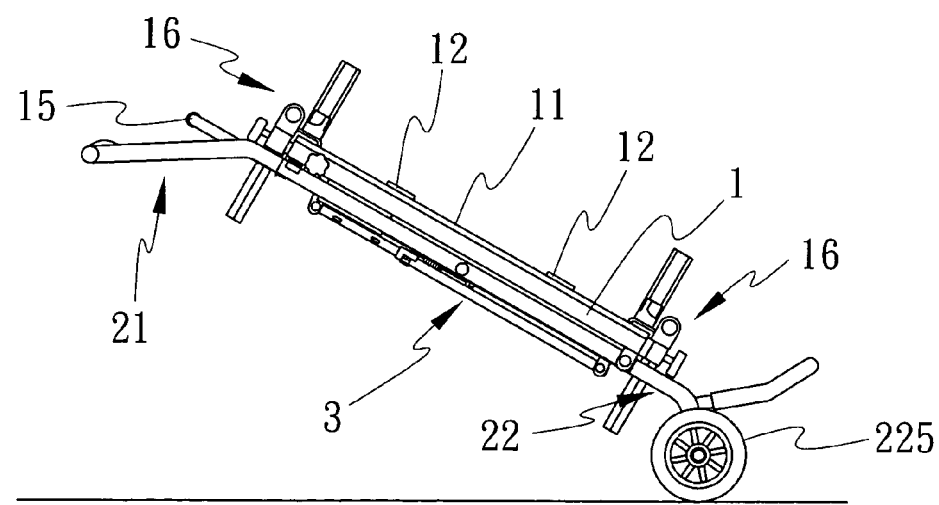
FIG. 13 is a schematic view showing a status of the present invention is being towed.

To retract the support frame 2, the hoisting cable 4 is pulled for the tension spring 36 to create a status of storing the energy and apply on the fastening device 33 as illustrated in FIG. 9. Meanwhile, the tabletop frame 1 maintains compressing upon the top end of the support frame 2, and the outer tube 31 and the inner tube 32 also maintain to be restricted by both catches 34. However, once the handle 15 provided on the side of the tabletop frame I is operated to lift the tabletop frame 1, the expansion force applied on the both ends of the telescoping rod 3 is released to force the outer tube 31 and the inner tube 32 to retract to each other thus to alternate the locations between the slot 312 and the positioning slot 321. Both catches 34 by taking advantage of the energy storage function provided by the fastening device 33 for being subject to the tension spring 36 dial outwardly with the claw 331 as illustrated in FIG. 10. As both of the slot 312 and the positioning slot 321 maintain staying at their alternative locations, both catches 34 rotate and completely clear out of the positioning slots 321 as illustrated in FIG. 11. Meanwhile, the user has to continue to pull the hoisting cable 4 for the tension spring 36 to maintain the fastening device 33 to uphold the catches 34 before releasing the power earlier exercised by lifting the handle 15, thus to have the weight of the tabletop frame 1 compressing against the top end of the support frame 2 and further to free both pairs of cross legs 21, 22 from the telescoping rod 3 to be retracted as illustrated in FIG. 12. One side of the cart is lifted up by operating the lower brace 213 of the first pair of cross legs 21 to allow the wheels 225 of the second pair of cross legs 22 touch the ground to carry the cart as illustrated in FIG. 13.

Similarly, the height for the support frame 2 to support the tabletop frame I can be altered by having the catches 34 to extend into another positioning slot 321 while controlling the telescoping rod 3 to retract so to adjust the level of the tabletop frame 1 as required by the operation.

For improved safety in retracting the support frame 2 and reduced load to the user, a pneumatic lever is provided between the upper trace 222 of the second pair of cross legs 22 and the tabletop frame 1 to slow down the inertia applied by the descending tabletop frame 1 while the support frame 2 is being retracted. Meanwhile, the pneumatic lever 5 also helps lift the tabletop frame 1 when the support frame 2 is stretched.

Figure 14:
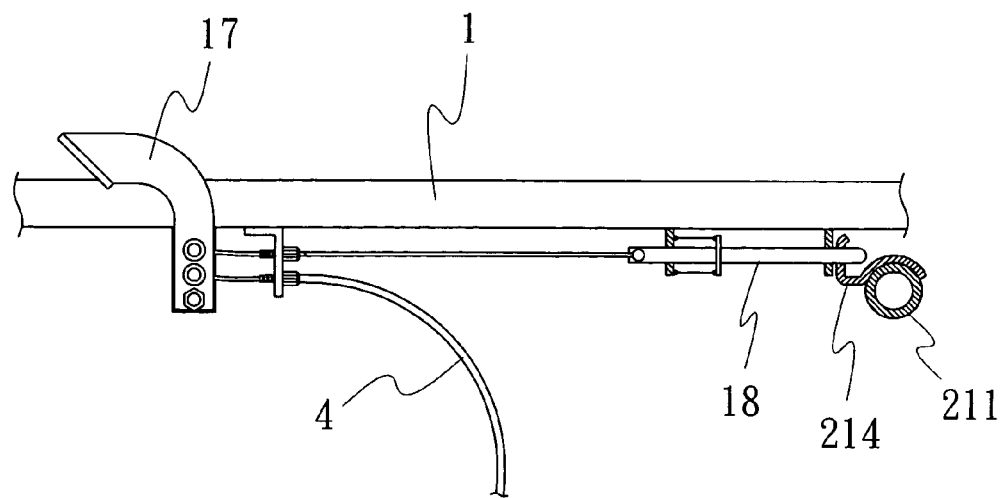
FIGS. 14 and 15 are schematic views respectively showing the control of retrieval and release of a hosting cable and a pin.
Figure 15:
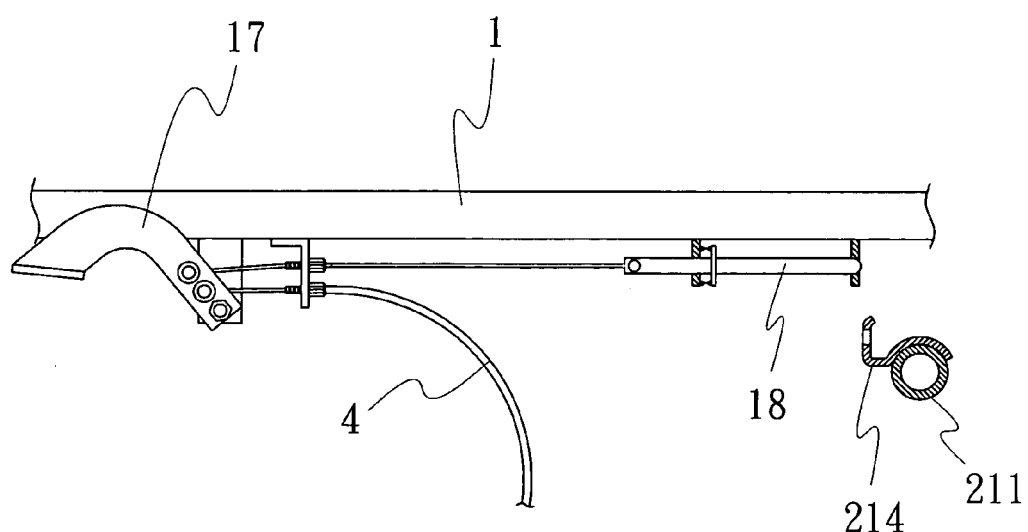

Now referring to FIGS. 2 and 14, a safety handle 17 is pivoted to a selected side of the tabletop frame 1, and a latch 214 is mounted to a selected side tube 211 of the first pair of cross legs 21. The safety handle 17 is linked to the hoisting cable 4 and a pin 18. Accordingly, when the safety handle 17 is pressed, it controls both of the hoisting cable 4 and the pin 18 at the same time to retract as illustrated in FIG. 15 with the pin 18 merely restricted in relation to the latch 214 without sliding when the support frame 2 is completed retracted.

Figure 16:
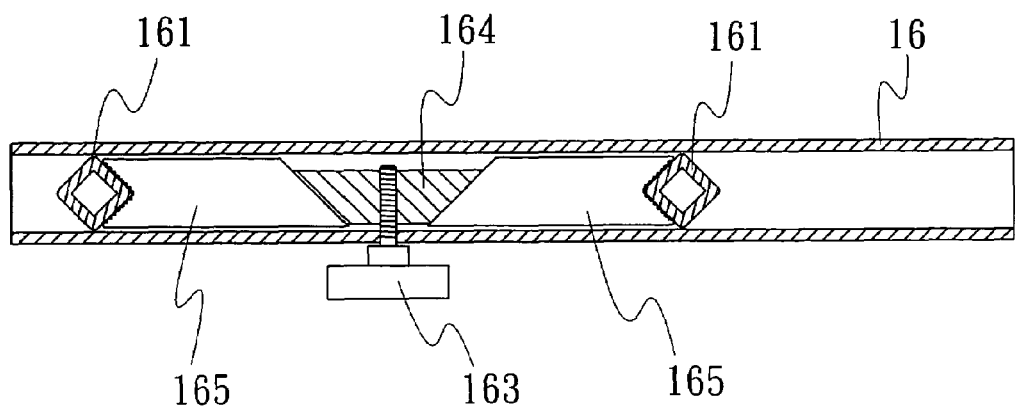
FIG. 16 is a sectional view of an extension bracket as assembled.
Figure 17:
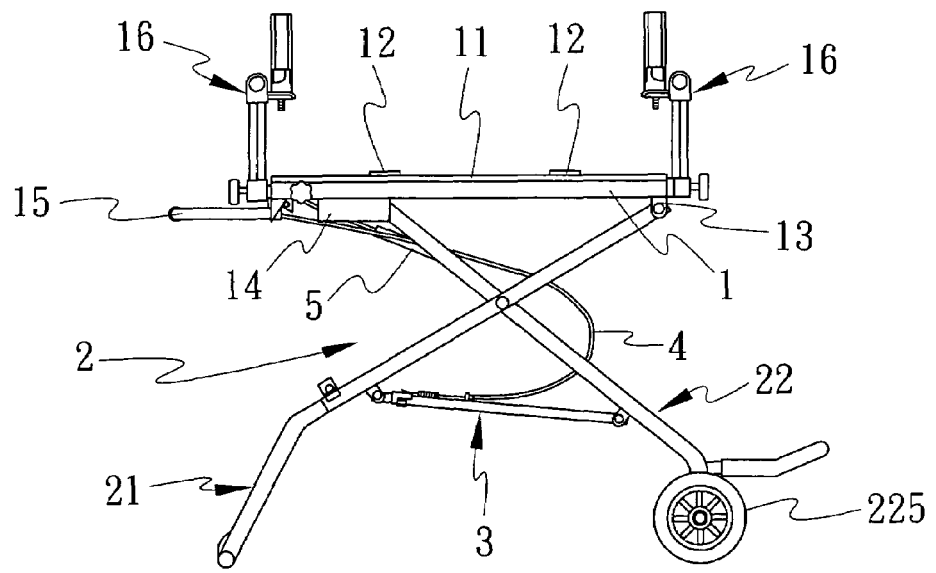
FIG. 17 is a schematic view showing a status of adjusting the height of a roller of the tabletop frame.
Figure 18:
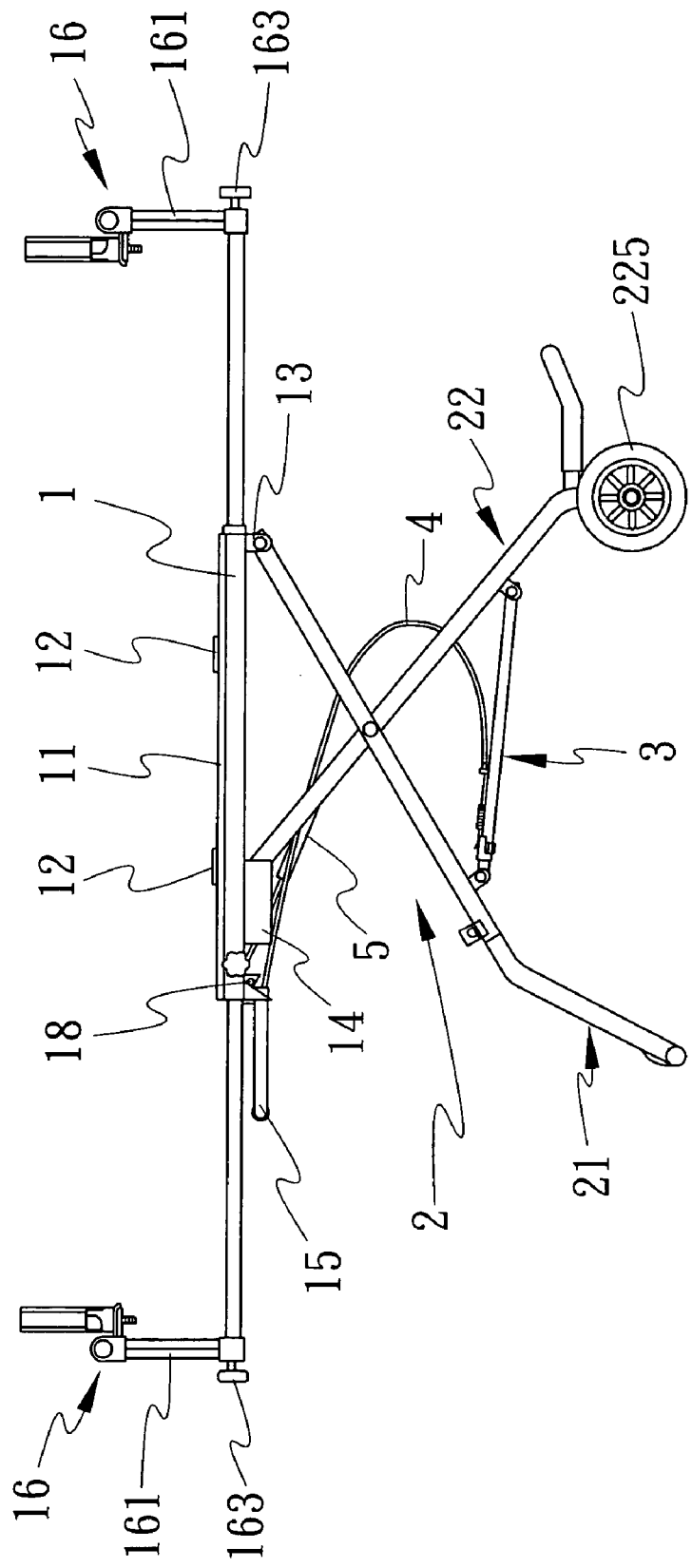
FIG. 18 is a schematic view showing a status of adjusting the length of the extension bracket of the tabletop frame.

Two extension rods 161 are vertically provided from the hollow tube at the rear of each extension bracket 16 on both sides of the tabletop frame 1. A roller 162 is laterally provided to the top of each extension rod 161. An oblique push block 164 disposed in the tube at the rear of the extension bracket 16 is drawn by a puller screw 163 to have both slopes of the oblique push block 164 respectively upholds against a slide rod 165. When pushed by the oblique push block 164, the slide rod 165 slides outwardly to hold against the body of the extension rod 161 for the latter to be firmly secured to the extension bracket 16 as illustrated in FIG. 16. Accordingly, the user may timely adjust both of the extension bracket 16 and the roller 162 to the proper upholding status depending on the height and length of an individual work piece for the cutting job when better or larger working spacing for the work piece on the tabletop frame I is required as illustrated in FIGS. 17 and 18.

What is claimed is:

1. A cutting machine push cart foldable and adaptable to any size of the cutting machine or similar machine, comprising: a tabletop frame, a support frame and a telescoping rod, the tabletop frame having multiple tracks, multiple locking plates, and multiple positioning plates, the multiple tracks being disposed on said tabletop frame parallel to one another, the multiple locking plates having a hole defined centrally therein, the locking plates being inserted into said trucks for locking said positioning plates onto said tracks, the tabletop frame including two pivot holders and two chutes provided on both sides at a bottom of the tabletop frame; the support frame including a first pair and a second pair of cross legs pivoted to each other at pivot point, a pulley provided at a top end of the second pair of cross legs, and two wheels pivotally attached to the lower end of the second pair of cross legs; the telescoping rod having both ends respectively pivoted to the first and the second pair of cross legs below said pivot point, the telescoping rod being extendable and retractable, a hoisting cable provided to control extension and retraction of the telescoping rod; the top of the first pair of cross legs being pivoted to the pivot holder of the tabletop frame; the pulleys at the top of the second pair of cross legs being inserted into the chutes.

2. The cutting machine push cart of claim 1, wherein the telescoping rod includes an outer tube, an inner tube inserted into the outer tube, a fastening device, two catches, a torsion spring and a tension spring; a positioning bit and a slot being provided at one end of the outer tube, multiple positioning slots being provided by the inner tube a claw extending downwardly from the fastening device, a limiting slot being disposed on the top end of the fastening device, and an eyelet being provided in the rear end of the fastening device; the torsion spring being provided between the positioning bit and the catches; the mobile end of the catch extending into the slot and the positioning slot; the fastening device being locked by the limited slot above the positioning bit of the outer tube; one end of the tension spring being hooked into the eyelet and the other end being hooked to a terminal of the hoisting cable.

3. The cutting machine push cart of claim 1, wherein an extension bracket is inserted into a hollow tube at each of both ends of the tabletop frame.

4. The cutting machine push cart of claim 3, wherein two extension rods are provided vertically to each hollow tube at the rear of the extension bracket and a roller is laterally provided at the tops of both extension rods; an oblique push block disposed in the extension bracket is drawn by a puller screw; both slopes of the oblique push block respectively upholding a slide rod; the slide rod sliding outwardly to hold against the body of the extension rod, and the extension rod being firmly secured to the extension bracket.

5. The cutting machine push cart of claim 1, wherein a handle is provided at a selected side of the tabletop frame.

6. The cutting machine push cart of claim 1, wherein each said positioning plate comprises a long slot defined therein and a locking hole is provided on both ends of the positioning plate.

7. The cutting machine push cart of claim 1, wherein a fixation bit is provided at a top end of the body of the outer tube to secure the hoisting cable.

8. The cutting machine push cart of claim 1, wherein a pneumatic lever is provided between the second pair of cross legs and the tabletop frame.

9. The cutting machine push cart of claim 1, wherein a safety handle is pivoted on a selected side of the tabletop frame and a latch is disposed on a selected leg of the first pair of cross legs.

10. The cutting machine push cart of claim 9, wherein the safety handle is linked to the hoisting cable and a pin; the hoisting cable being configured to control the extension and retraction of the telescoping rod, and the pin being restricted when the push cart is retracted.

* * * * *